United States Patent [19]
Stacey

[11] Patent Number: 5,852,553
[45] Date of Patent: Dec. 22, 1998

[54] HARMONIC NEUTRALIZED VOLTAGE SOURCED INVERTER EMPLOYING PHASE SHIFTING INTERPHASE TRANSFORMERS

[75] Inventor: Eric John Stacey, Pittsburgh, Pa.

[73] Assignee: Westinghouse Electric Corporation, Pittsburgh, Pa.

[21] Appl. No.: 911,156

[22] Filed: Aug. 14, 1997

[51] Int. Cl.$^6$ .................................................. H02M 7/00
[52] U.S. Cl. ................................. 363/64; 363/71; 363/43
[58] Field of Search ................................. 363/71, 41, 42, 363/43, 64, 137

[56] References Cited

U.S. PATENT DOCUMENTS

| | | | |
|---|---|---|---|
| 4,560,917 | 12/1985 | Gyugyi | 323/210 |
| 4,870,557 | 9/1989 | Stacey | 363/43 |
| 5,168,437 | 12/1992 | Gyugyi | 363/42 |
| 5,337,227 | 8/1994 | Stacey et al. | 363/71 |
| 5,446,643 | 8/1995 | McMurray | 363/40 |
| 5,515,264 | 5/1996 | Stacey | 363/132 |
| 5,703,767 | 12/1997 | Stacey | 363/40 |

OTHER PUBLICATIONS

EPE'89 Proceedings vol. III, 3rd European Conference on Power Electronics and Applications Eurogress Aachen, Oct. 9–12, 1989, Federal Republic of Germany New Rectifier Circuits w/ Low Main Pollution & Additional Low Cost Inverter for Energy Recovery.

*Primary Examiner*—Shawn Riley
*Attorney, Agent, or Firm*—Richard V. Westerhoff; Eckert Seamans Cherin & Mellott, LLC

[57] ABSTRACT

Sets of phase shifting interphase transformers are used to combine the outputs of six-pulse static inverter stages to generate harmonic neutralized outputs with higher pulse counts. The phase shifting interphase transformers have a primary winding and at least one secondary winding. For phase shifting interphase transformers having a single secondary winding, a tap on the primary winding is connected through the secondary windings on one of the other phase shifting interphase transformers to produce a combined output having a displacement factor which preserves the displacement factors of the inputs. When the phase shifting interphase transformer has two secondary windings, the tap on the primary is a center tap which is routed through secondary windings on each of the other two phases. Higher pulse count inverters are constructed by combining outputs of the phase shifting interphase transformers with additional shifting interphase transformers to generate a combined output. For inverters with an odd number of six-pulse inverter bridges, a hierarchy of phase shifting interphase transformers produces a single "pairs" output which is in phase with and combined with the output of the remaining inverter stage by a current splitting interphase transformer to produce the final, harmonic neutralized output.

8 Claims, 7 Drawing Sheets

HARMONIC NEUTRALIZED VOLTAGE SOURCED INVERTER EMPLOYING PHASE SHIFTING INTERPHASE TRANSFORMERS

BACKGROUND OF THE INVENTION

1. Field of the Invention

This invention relates to apparatus for harmonic neutralization of voltage waveforms in static inverters. More particularly, it relates to such apparatus which essentially eliminates harmonic components in the output voltages through use of phase shifting inter-phase transformers.

2. Background Information

High power static inverters utilize a plurality of phase displaced bridge inverter circuits phased shifted by transformers to produce a composite waveform having a pulse count equal to the sum of the pulses generated by the separate bridge circuits and with reduced harmonics. Such static inverters are now commonly used for many applications, including industrial drives, power conditioning, dc-link frequency conversion, and generation of controllable leading or lagging reactive, and in some cases, real current.

Typically, such large three-phase harmonic neutralized inverters employ special configurations to combine six-pulse outputs from several three-phase bridges into high quality multipulse waveforms identical to a periodically sampled sinusoid. For a (6×M) pulse output, "M" displaced sets of six-pulse (three-phase) inverter bridges are required. Each six-pulse bridge output being displaced from the next by $(360/6M)°$.

The basic six-pulse inverter has three poles which operate at fundamental frequency, connected to a common dc-voltage-source.

The basic six-pulse waveform contains harmonics having:

| | |
|---|---|
| frequencies | $(6n \pm 1)*f1$ |
| and amplitudes | $1/(6n \pm 1)*Vf.$ |

Where n is the harmonic; f1 is the fundamental frequency, and Vf is the amplitude of fundamental voltage.

The classical approach employs several separate phase shifting transformers having isolated primary and secondary windings, one for each six-pulse bridge, to combine the outputs. The windings on these transformers are configured so that the fundamental components of secondary voltages are brought into phase and summed directly by series connection of the secondaries. Parallel connection of the secondaries can also be used, but would require current splitting interphase transformers (IPTs) between secondaries. When the fundamental voltages are brought into phase, harmonics are rotated and either sum to zero or remain at their original per unit (PU) amplitudes. This approach requires a number of equally rated transformers whose total rating corresponds to the total output. Because of their cost, and difficulties in obtaining accurate phase shift angles needed for true harmonic neutralization, this approach is not often used to construct inverters with high pulse numbers.

The most common harmonic neutralized inverter of this type is a 12-pulse configuration which combines outputs from two six-pulse bridges which are displaced by 30°. It produces a 12-pulse output containing harmonics at $(12n\pm1)*f$ and amplitudes $1/(12n\pm1)*Vf.$ A 12-pulse inverter can easily be configured from two six-pulse bridges with simple transformers employing WYE and DELTA primaries and having series connected WYE secondaries. Because of the out-of-phase harmonics (5th, 7th and multiples thereof), separate transformers are normally used for each six-pulse bridge. A special arrangement which enables a single transformer with WYE and DELTA primaries to be used can be constructed if a special harmonic blocking transformer is included to prevent the circulation of these harmonics.

Pulse numbers which are multiples of 12, can be realized in simplified "quasi-harmonic-neutralized" arrangements by combining two or more displaced sets of 12-pulse inverters with simple interphase transformers (IPTs) which would average the voltage and divide the load current between all the displaced inputs connected to each primary terminal. Such an approach was described in U.S. Pat. No. 5,337,227.

There is a need for an improved high-power static inverter which provides an output essentially free of harmonics.

There is an additional need for such an improved inverter which is cost effective.

There is a more particular need for such an improved static inverter which does not require transformers with a combined rating that corresponds to the total output of the inverter.

SUMMARY OF THE INVENTION

These needs and others are satisfied by the invention which is directed to a static inverter which utilizes sets of phase shifting interphase transformers connected between adjacent pairs of multipulse three-phase static switching stages for phase shifting currents and voltages across the phase shifting interphase transformers by amounts which maintain displacement factors between the currents and voltages in the combined output which are the same as the displacement factors in the multipulse three-phase static switching stages.

Each of the phase shifting interphase transformers comprises a primary winding connected between corresponding phases of adjacent pairs of the multipulse three-phase static switching stages, a tap on the primary winding, and at least one secondary winding connected in series with a tap on a phase shifting interphase transformer connected across another phase of the pair of three-phase static switching stages. This arrangement results in a phase shift in the combined current output. The turns on the phase shifting interphase transformer windings are selected to shift the combined voltage by the same amount so that the displacement factor between the current and the voltage of the combined output remains the same as for the inputs to the phase shifting interphase transformer. In the embodiment in which the phase shifting interphase transformer has a single secondary winding, the tap on the primary winding is off-centered to produce the required turns ratios. In a symmetrical arrangement, two secondary windings are provided on the phase shifting interphase transformers and the tap on the primary is a center tap. Each center tap from the other two interphase transformers passes through a different one of the secondary windings. For higher pulse inverters, a hierarchy of sets of phase shifting interphase transformers, each with one or two secondary windings, produces a combined output in which the harmonics are minimized.

As another aspect of the invention, odd numbers of multipulse inverter stages are combined by means which include sets of phase shifting interphase transformers combining outputs of pairs of the multipulse inverter stages to produce intermediate outputs. Additional phase shifting interphase transformers combine the intermediate outputs to produce a single, pairs output. This single, pairs output is in phase with and is combined with the remaining, odd, multipulse inverter stage by a current splitting interphase transformer to produce the final, harmonic neutralized output.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
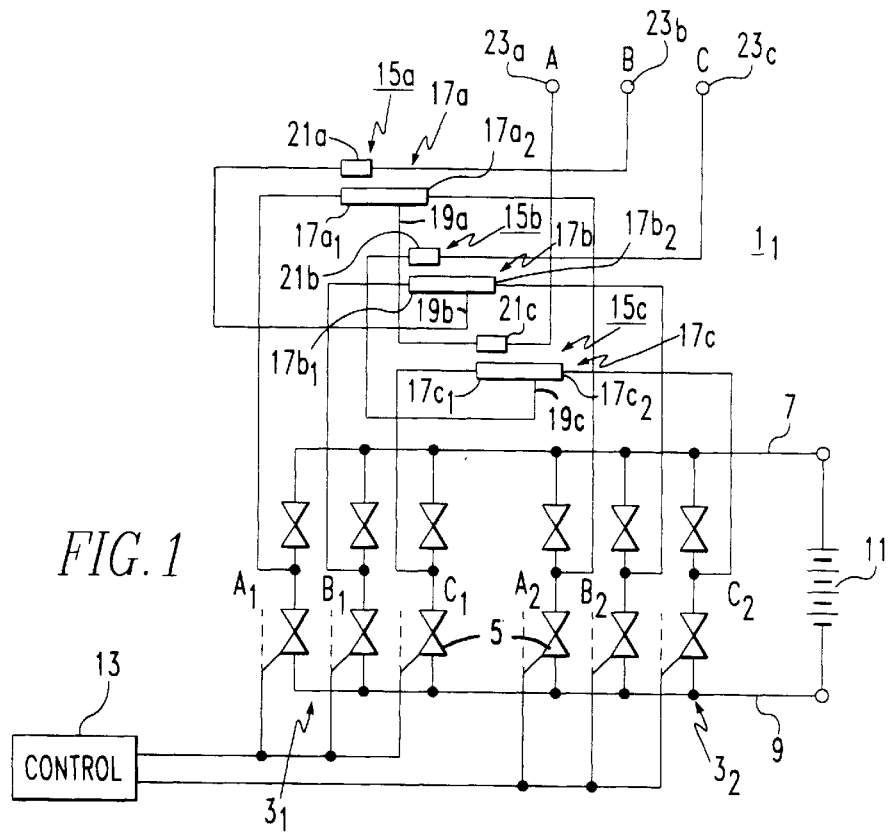
FIG. 1 is a schematic diagram of a 12-pulse harmonic neutralized inverter in accordance with a first embodiment of the invention.

FIG. 1 illustrates a 12-pulse harmonic neutralized inverter $1_1$ employing phase shifting interphase transformers in accordance with the invention. This inverter 1 includes two six-pulse, three-phase static switching stages $3_1$ and $3_2$. Each of these six-pulse stages 3 is a bridge of pairs of static switches 5, connected between a positive dc bus 7 and a negative dc bus 9 energized by a dc source 11. By way of example, for high power applications, the static switches 5 can be gate turn off devices (GTO's) shunted by antiparallel diodes. Three-phase ac outputs $A_1$, $B_1$, $C_1$ and $A_2$, $B_2$, $C_2$ are generated at the mid-points between each pair of GTOs 5. Gating of the GTOs 5 is controlled by a control circuit 13 to generate for each of the bridges $3_1$ and $3_2$ a six-pulse output with the waveform generated by the second bridge $3_2$ displaced 30° from the waveform generated by the first bridge $3_1$.

The 12-pulse, neutralized inverter 1 further includes a set 15 of three-phase shifting interphase transformers 15a, 15b, and 15c. Each of these phase shifting interphase transformers 15a–15c has a primary winding 17a, 17b, and 17c respectively, with a tap 19a, 19b, and 19c which divides the primary winding into first and second sections $17a_1$ and $17a_2$ through $17c_1$ and $17c_2$. In addition, each of the phase shifting interphase transformers of the set 15 includes a single secondary winding 21a, 21b, and 21c magnetically coupled with the corresponding first section $17a_1$–$17c_1$.

The ends of the primary windings 17a–17c are connected to the corresponding phase outputs on the two six-pulse bridges $3_1$ and $3_2$. The taps on the respective primary windings serve as the phase outputs at 23a, 23b, and 23c, respectively. However, each of these taps is connected to the output through the secondary winding 21 of one of the other 120° shifted phases. Thus, in the example the tap 19a for the a-phase is connected through the secondary winding 21c to the output 21a. Similarly, the tap 19b of the b-phase shifting interphase transformer 15b is connected through the a-phase secondary winding 21a to the output 23b, and the tap 19c is connected through the secondary winding 21b to the c output 23c.

Figure 2:
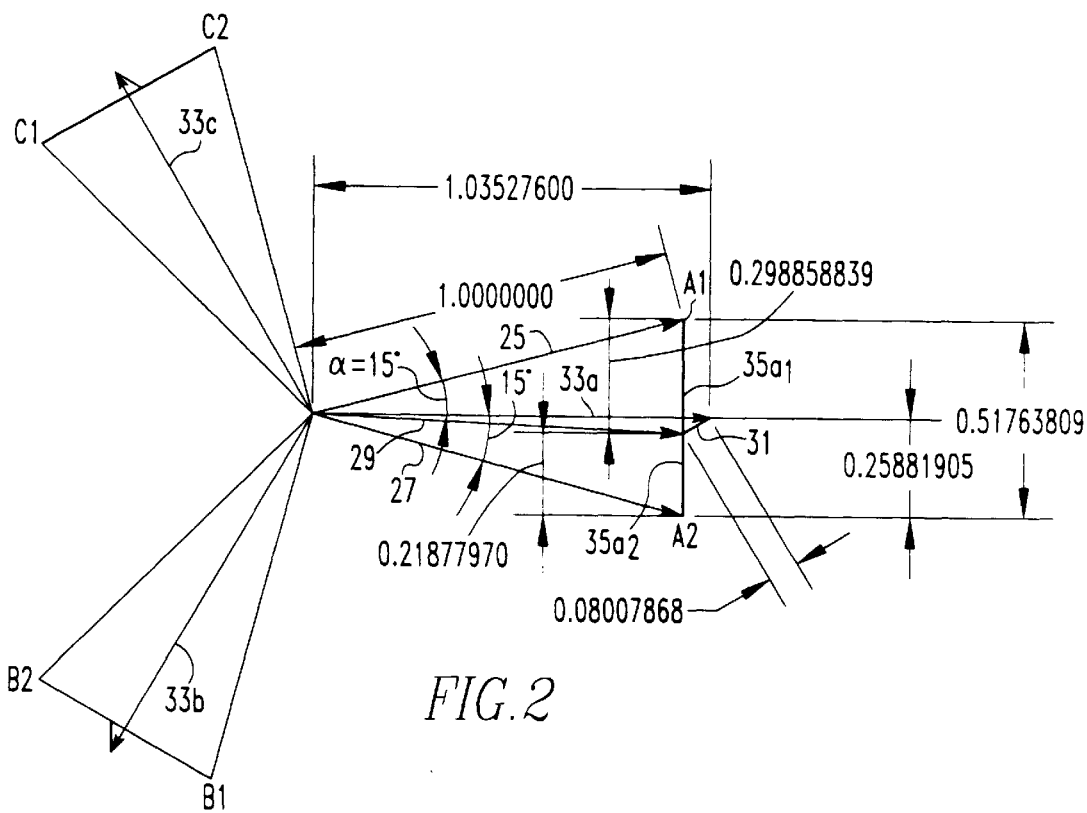
FIG. 2 is a geometric representation for the 12-pulse harmonic neutralized inverter of FIG. 1, illustrating calculation of the turns ratios for the windings of the phase shifting interphase transformers which form part of the inverter of FIG. 1.

As previously mentioned, the location of the tap 19 on each of the phase shifting interface transformers of the set 15 and the number of turns on the secondary winding 21 are selected to produce combined output currents and voltages at the outputs 23 which have the same displacement factors as the current and voltage outputs of the individual six-pulse bridges 3. FIG. 2 is a diagram which illustrates the manner in which the turn ratios are determined. The combined current produced at the output 23 will have a per unit value of:

$$i_o = 2 \cos \alpha \qquad \text{Eq.(1)}$$

where α=½ of the displacement angle between the waveforms generated in the two bridges 3 coupled by the phase shifting interphase transformer, i.e., 15°. The per unit output voltage will then be:

$$v_o = 1/\cos \alpha \qquad \text{Eq.(2)}$$

the combined per unit power output is then:

$$VA = i_o * v_o = 2/\cos \alpha * 1/\cos \alpha = 2 \qquad \text{Eq.(3)}$$

As the combined current, $i_o$, bisects the displacement angle α the output voltage, $v_o$, must do the same in order for the displacement factor at the outputs 23 to remain the same as at the inputs to the phase shifting interphase transformers 15. FIG. 2 is a diagram which illustrates geometrically the manner in which the location of the tap 19 and the number of turns on the secondary windings 21 are selected to produce the required phase shift in the voltage and to generate an output voltage having the magnitude determined by Eq. 2. The A phase output voltages of the bridges $3_1$ and $3_2$ are represented by the vectors 25 and 27 and have a per unit value of 1, and a displacement of 30°. The combined output voltage produced at the off-center tap 19 is represented by the vector 29. As can be seen from FIG. 1, the tap 19a of the phase shifting interphase transformer 15a is routed through the secondary winding 21c of the phase shifting interphase transformer 15c. This produces a phase shift in the combined voltages represented by the vector 31, which as can be seen from FIG. 2 is parallel to the interphase voltage C1–C2. This produces a resultant output voltage, $v_o$, represented by the vector 33a. The per unit values of the segments $35a_1$ and $35a_2$ determine the turns ratio for the location of the off-center tap 19 on the phase shifting interphase transformer 15 while the per unit value of the vector 31 provides the turns ratio for the secondary winding 21. The values are selected so that the resultant output voltage vector 33a bisects the voltage input vectors 25 and 27 to the phase shifting interphase transformer, and has a magnitude as determined by Eq. (2). The location of the off-center taps 19b and 19c and the secondary turns on the transformers 15a and 15b, respectively, are similarly determined to produce the output voltage vectors 33b and 33c.

Figure 3:
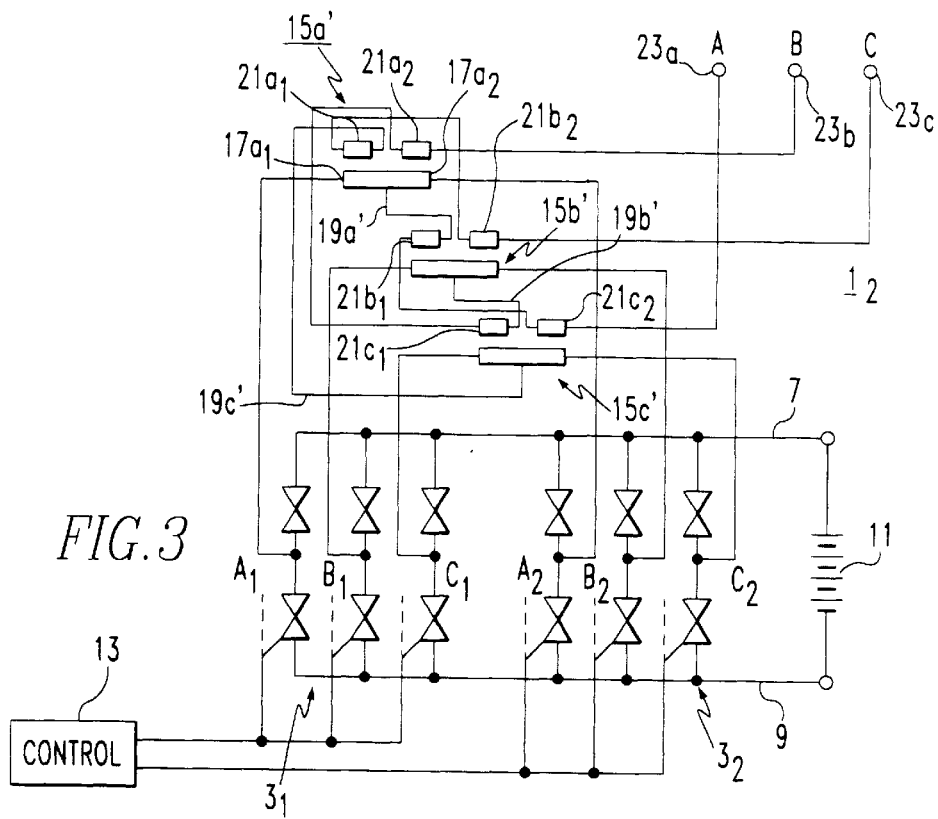
FIG. 3 is a schematic diagram of a 12-pulse harmonic neutralized inverter employing symmetrical phase shifting interphase transformers in accordance with a second embodiment of the invention.

FIG. 3 illustrates an inverter $1_2$ in accordance with another embodiment of the invention in which each of the interphase transformer 15a'–15c', has two secondary windings $21a_1$ and $21a_2$ through $21c_1$ and $21c_2$. In this symmetrical situation the taps 19a–19c are center taps.

Figure 4:
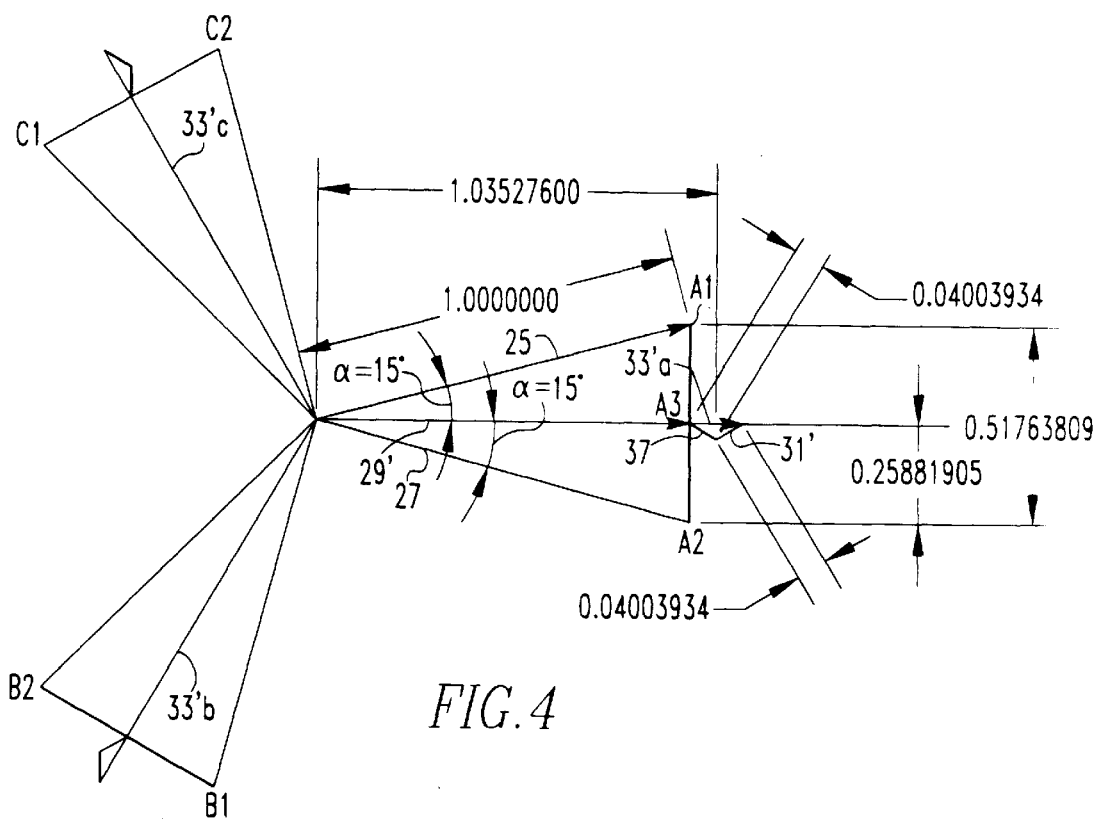
FIG. 4 is a geometric representation for the 12-pulse harmonic neutralized inverter of FIG. 3, illustrating calculation of the turns ratios for the windings of the phase shifting interphase transformers in the inverter of FIG. 3.

FIG. 4 is a geometrical representation for determining the turns ratio for the symmetrical phase shifting interphase transformers used in FIG. 3. Here, because the taps 19 are center taps, the voltage vector 29' produced by the symmetrical primary winding 17a bisects the displacement angle α between the phase $A_1$ and phase A2 voltage vectors 25 and 27. However, it does not have the proper magnitude to preserve the displacement factor in the output voltage. The secondary winding $21c_2$ through which the tap 19a' passes introduces a phase shift in the combined voltage represented by the vector 31' in FIG. 4. The center tap 19a' also is connected through the secondary winding $21b_1$ which produces an additional phase shift represented by the vector 37 in FIG. 4. The resultant vector 33a' also bisects the displacement angle α and has the same magnitude as the output voltage vector 33a in FIG. 2 determined by Eq. (2). Finally, the resultant output voltages on the center taps 19b' and 19c' of the phase shifting interphase transformers 15a' and 15b' have components provided by the secondary windings of the other two phase shifting interphase transformers.

Figure 5:
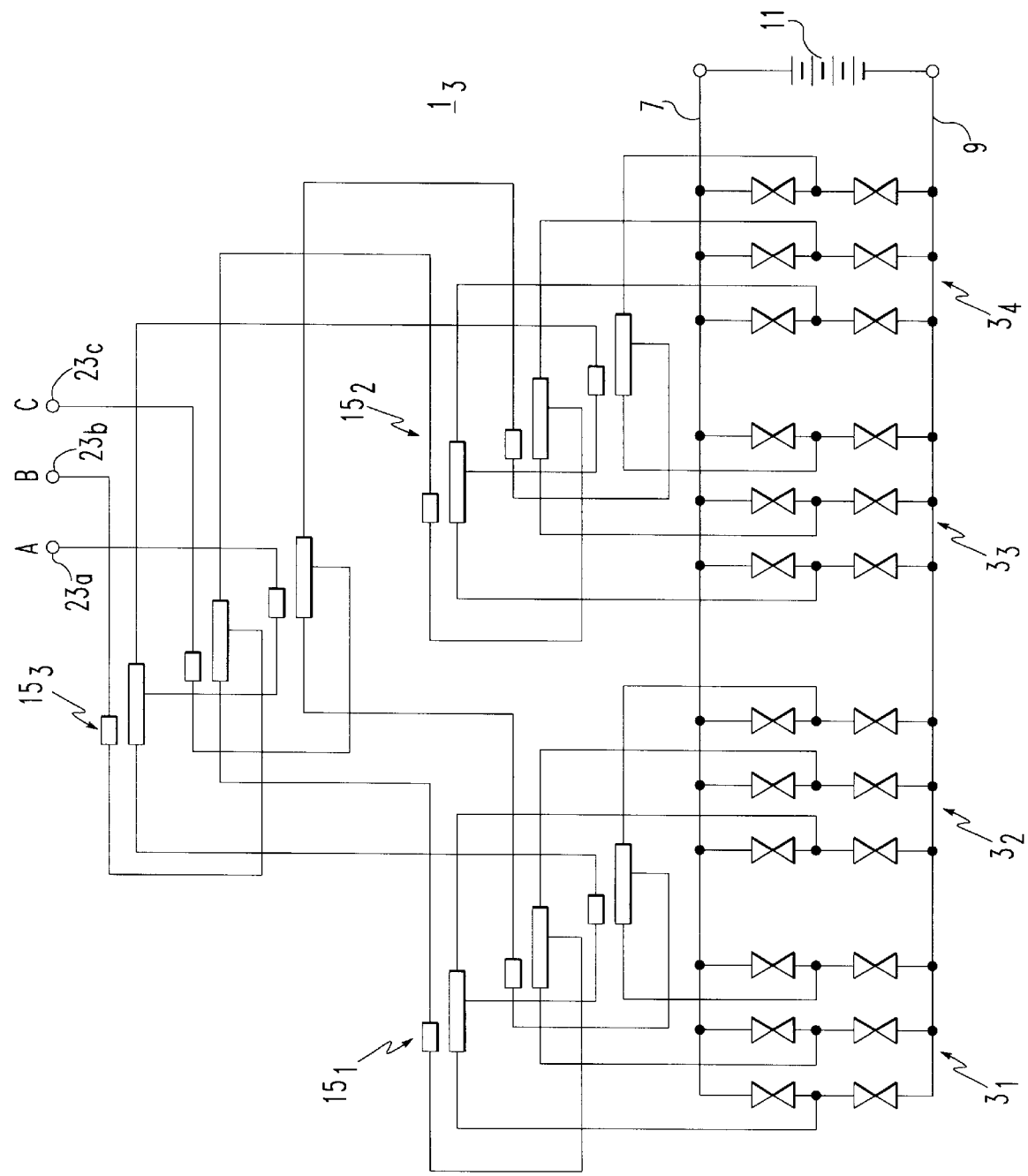
FIG. 5 is a schematic diagram of a 24-pulse harmonic neutralized inverter utilizing the embodiment of FIG. 1.
Figure 6:
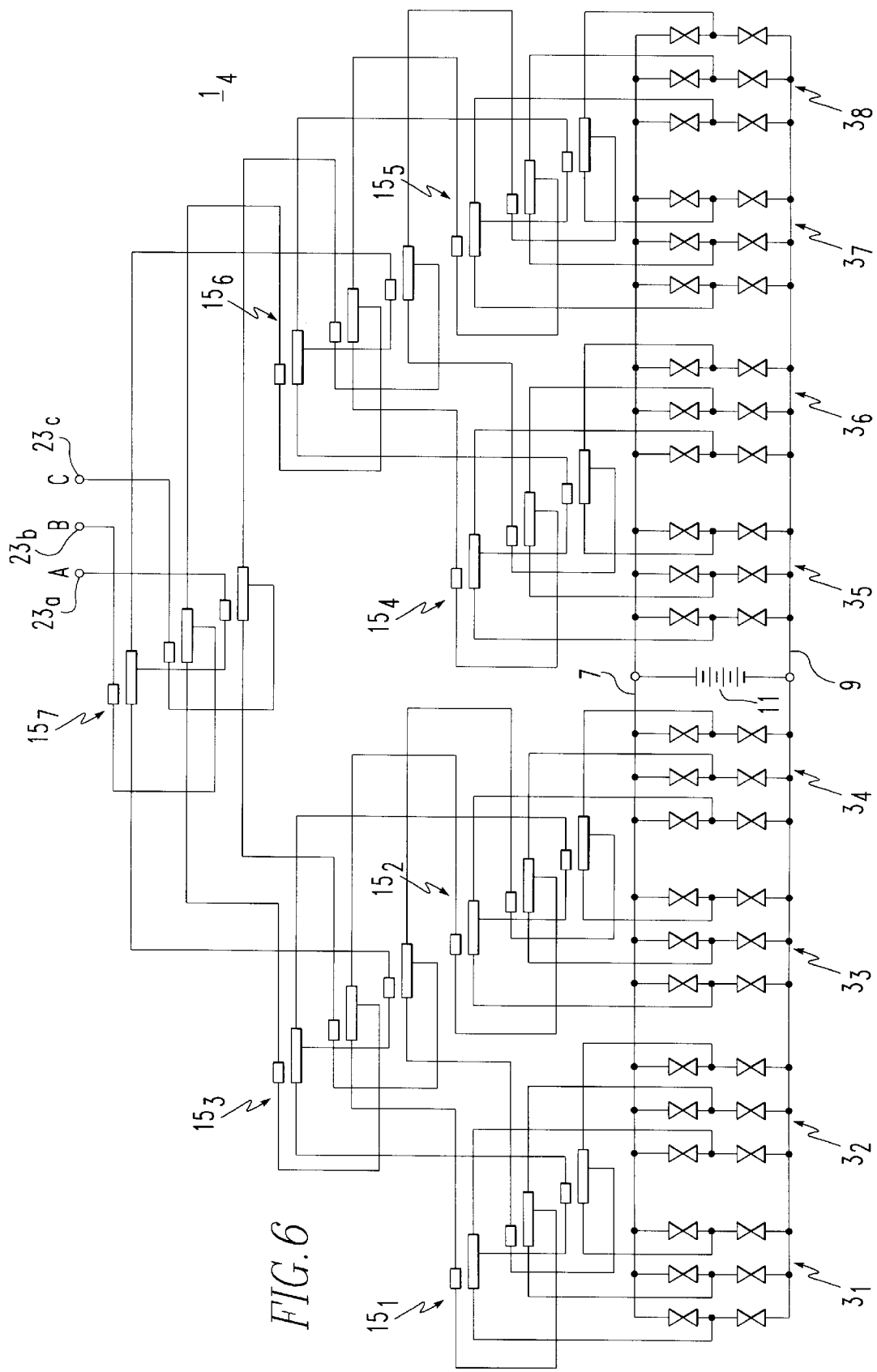
FIG. 6 is a schematic diagram of a 48-pulse harmonic neutralized inverter combining two of the 24 pulse inverters of FIG. 5.

FIG. 5 illustrates a 24 pulse harmonic neutralized inverter $1_3$ employing sets of phase shifting interphase transformers 15 in accordance with the invention. In this case, there are two pairs $3_1, 3_2$ and $3_3, 3_4$ of six-pulse bridges each of which are combined by a set of phase shifting interphase transformer $15_1$, and $15_2$ respectively, with the outputs of these two phase shifting interphase transformers combined in a third set of phase shifting interphase transformers $15_3$. Thus, multipulse inverters with higher pulse counts can be constructed by combining pairs of outputs from each multipulse stage using additional sets of phase shifting interphase transformers 15. For example, FIG. 6 illustrates a 48 pulse harmonic neutralized inverter $1_4$ employing seven sets of phase shifting interphase transformers $15_1$–$15_7$ arranged in a hierarchal pattern to combine the outputs of 8 six-pulse three-phase bridges $3_1$–$3_8$.

Figure 7:
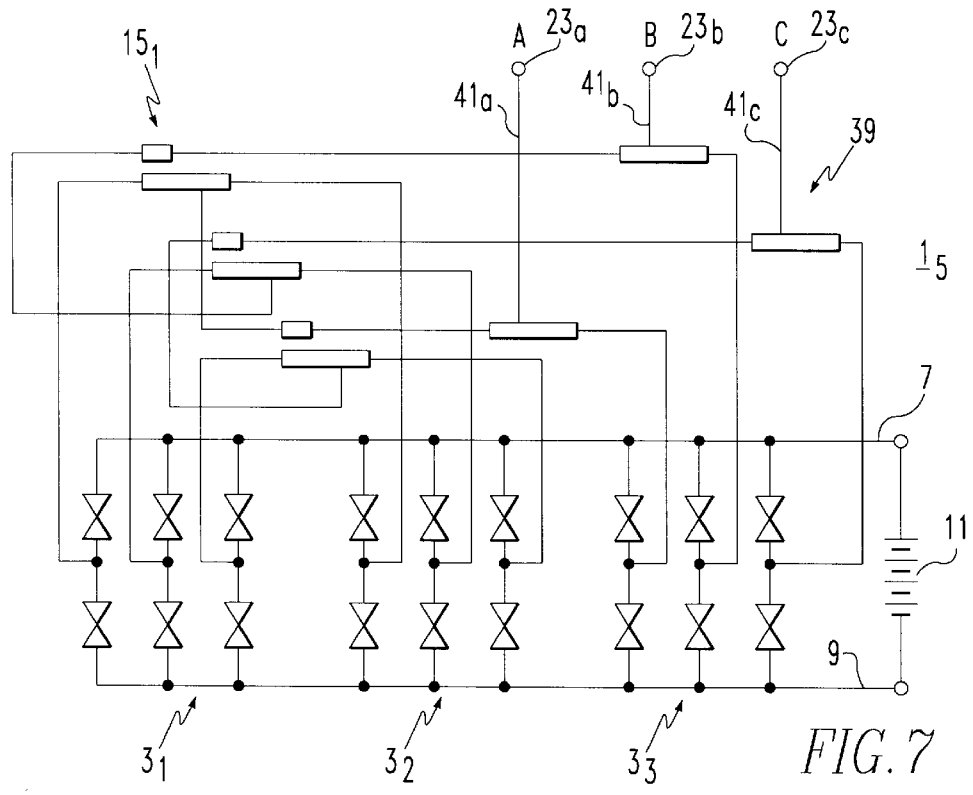
FIG. 7 is a schematic diagram of an 18-pulse harmonic neutralized inverter incorporating the invention.

Another aspect of the invention utilizes phase shifting interphase transformers together with conventional current splitting transformers to combine odd numbers of six-pulse three-phase bridge circuits. In this arrangement, the outer inputs are first combined with phase shifting interphase transformers to bring them into phase with the middle input, which is then connected through an appropriate current splitting interphase transformer. The simplest embodiment of this approach combines three 20° displaced six-pulse inverters to produce a perfect 18 pulse inverter. Thus, as shown in FIG. 7, the two six-pulse bridges $3_1$ and $3_2$ are combined in the inverter $1_5$ by the set of phase shifting interphase transformers $15_1$. The outputs of this set of phase shifting interphase transformer $15_1$ are in phase with the output of the third six-pulse bridge $3_3$ and are therefore combined through a three-phase set of current splitting interphase transformers 39. Note that the taps 41 on the interphase transformers 39 are not center taps as they are combining the outputs of a single six-pulse bridge with the combined output of two other bridges.

Figure 8:
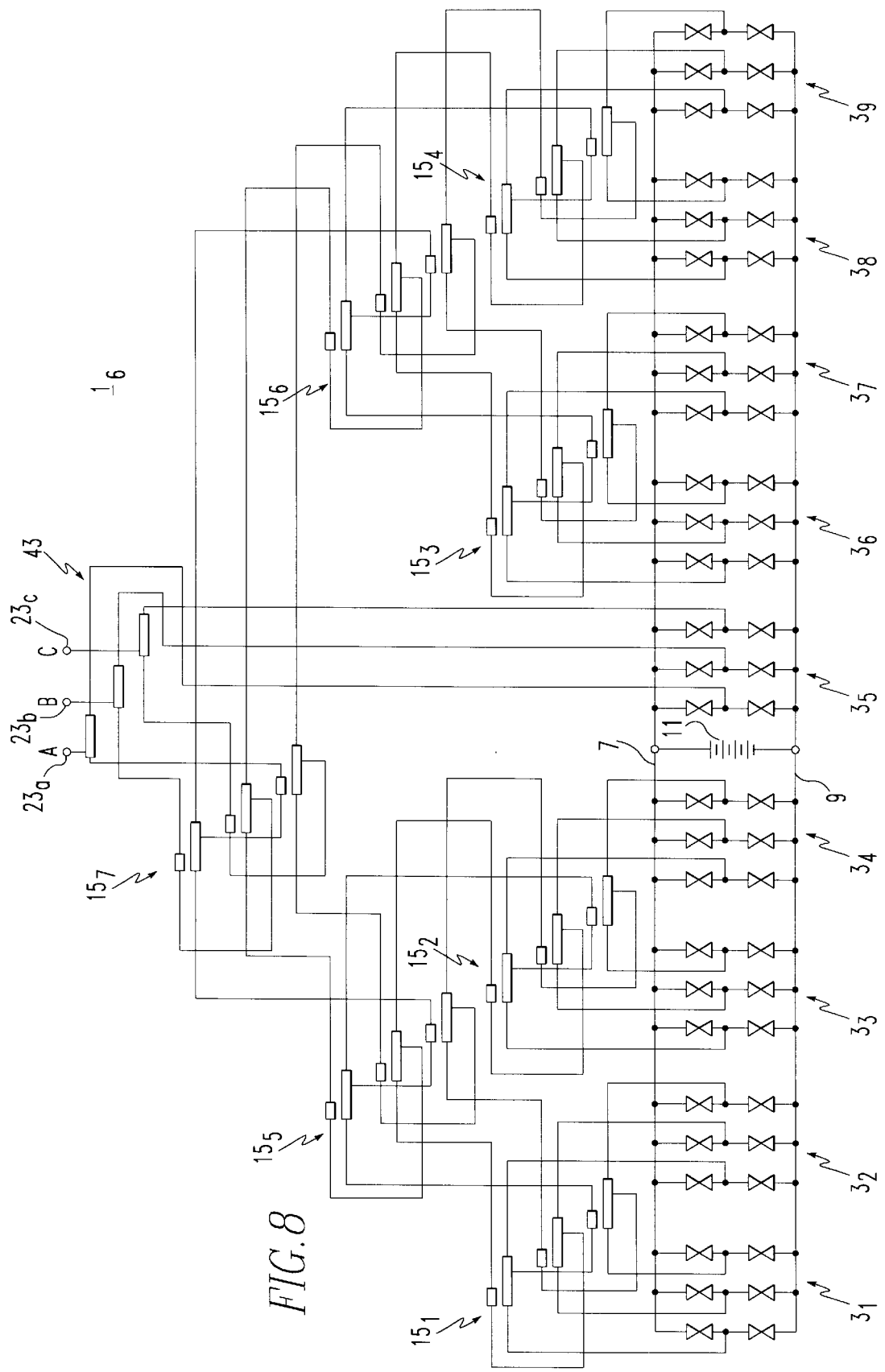
FIG. 8 is a schematic diagram of a 54-pulse harmonic neutralized inverter incorporating the invention.

A 54 pulse harmonic neutralized inverter $1_6$, which incorporates nine six-pulse inverter stages $3_1$–$3_9$, is shown in FIG. 8. Pairs of these six-pulse inverter stages are combined by sets of phase shifting interphase transformers $15_1$–$15_4$ to generate intermediate combined outputs. A hierarchial arrangement of additional phase shifting interphase transformer sets $15_5$–$15_7$ combine these intermediate outputs to generate a single "pairs" output from the set of phase shifting interphase transformers $15_7$. This output is in phase with the output of the remaining, odd, six-pulse inverter stage $3_5$. These two in phase, three-phase outputs are then combined by a set of current splitting interphase transformers 43 to generate the final three-phase harmonic neutralized output. Note that the tap 45 on the current splitting interphase transformers 43 are off centered to accommodate for the fact that the output from a single six-pulse inverter stage is being combined with the combined output of all the other eight inverter stages. While the sets of phase shifting interphase transformers used in the 54-pulse inverter of FIG. 8 have single secondary windings, transformers with two secondary windings and a center tap can be used instead.

Figure 9:
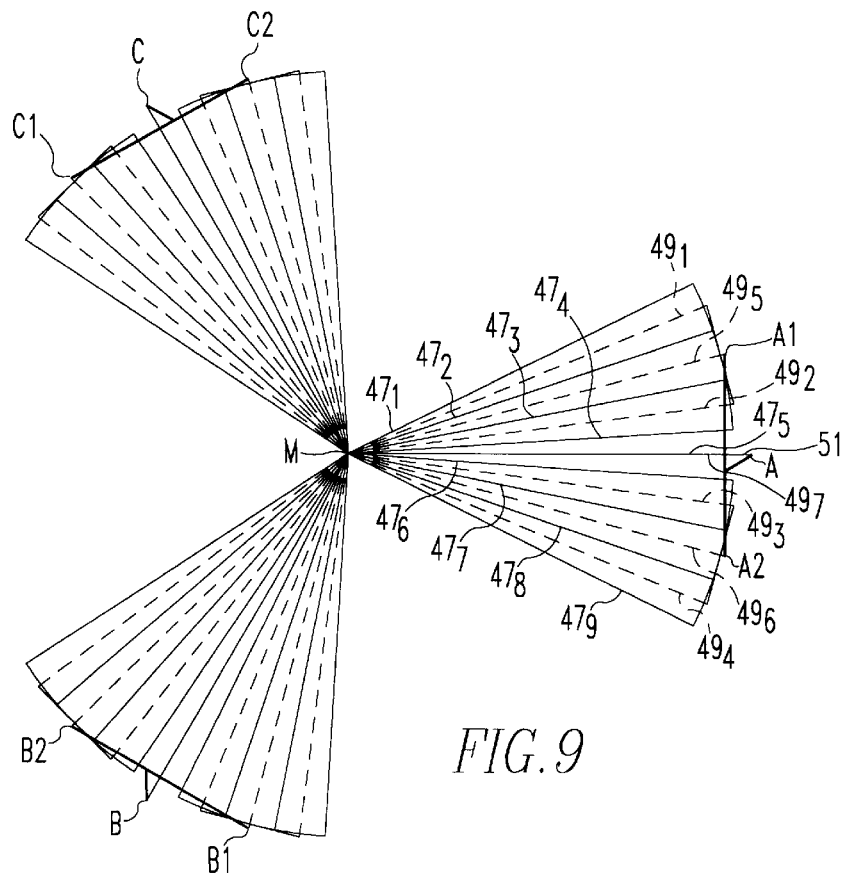
FIG. 9 is a geometric representation for the 54-pulse inverter of FIG. 8 illustrating the combination of the voltage vectors effected by the phase shifting interphase transformers and the current shifting transformer.

FIG. 9 is a diagram geometrically demonstrating the manner in which the outputs of the nine six-pulse bridges $3_1$–$3_9$ in FIG. 8 are combined. The voltages $47_1$–$47_9$, displaced by 60/9°, are combined in pairs with the outputs generated by the phase shifting interphase transformers $15_1$–$15_7$ represented by the dashed vectors $49_1$–$49_7$, respectively. The output $49_7$, as mentioned, is in phase with the output $47_5$ of the six-pulse bridge $3_5$ so that they can be combined in the current splitting interphase transformer 43 to produce the final output represented by the vector 51 in FIG. 9.

Figure 10:
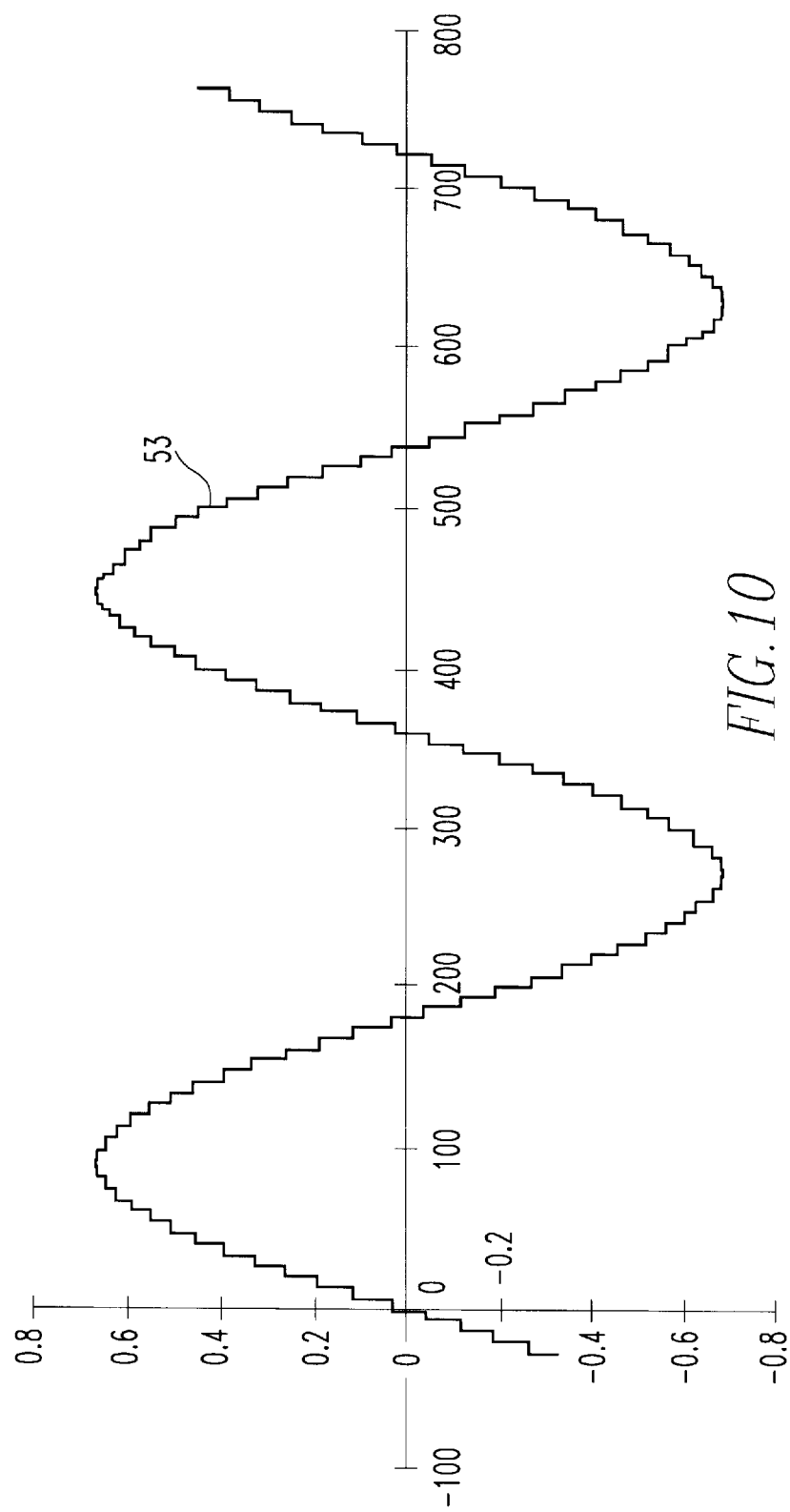
FIG. 10 is a waveform diagram of the output generated by the 54-pulse inverter of FIG. 8.

FIG. 10 illustrates the 54-pulse harmonic neutralized wave form 53 generated by the inverter of FIG. 8.

The invention results in multipulse inverters which produce harmonically neutralized outputs utilizing phase shifting transformers which only need have a fraction of the rated output. For instance, the phase shifting interphase transformers for the 12-pulse inverters of FIG. 1 and 3 need only be rated at less than about seventeen percent of the output power of the inverter. The hierarchial arrangements of the sets of phase shifting interphase transformers shown in FIGS. 5 and 6 generate perfect 24 and 48-pulse wave forms requiring phase shifting interphase transformers rated, respectively, at less than about twenty-four percent and less than about twenty-eight percent of the output power.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A static inverter comprising:

a plurality of multipulse three-phase static inverter stages;

control means operating switches in said multipulse three-phase static inverter stages at discretely spaced electrical angles; and combining means comprising at least one set of phase shifting interphase transformers connected between adjacent pairs of multipulse three-phase static inverter stages, phase shifting currents and voltages across said phase shifting interphase transformers by amounts which maintain displacement factors between said currents and voltages across said phase shifting interphase transformer.

2. The static inverter of claim 1, wherein each phase shifting interphase transformer in said at least one set of phase shifting interphase transformers comprises a primary winding connected between corresponding phases of said pair of multipulse three-phase static inverter stages, a tap on said primary winding providing a combined output from said pair of multipulse three-phase static inverter stages, and at least one secondary winding connected in series with a tap of a phase shifting interphase transformer connected across another phase of said pair of multipulse three-phase static inverter switches to generate a combined phase output.

3. The static inverter of claim 2, wherein said phase shifting interphase transformers comprise a second secondary winding connected in series with said tap of said phase shifting interphase transformer connected across a remaining phase of said multipulse three-phase static inverter stages, said taps on said primary windings being center taps.

4. The static inverter of claim 2, wherein said tap divides said primary winding into a first section having a first number of turns and a second section having a second number of turns, and wherein said secondary winding has a third number of turns, said first, second, and third number of turns being selected to maintain said displacement factor for said currents and voltages across said phase shifting interphase transformer.

5. The static inverter of claim 3, wherein said center tap divides said primary winding into a first section having a first number of turns and a second section having a second number of turns equal to said first number of turns, and wherein said secondary windings each have a third number of turns, said first, second and third number of turns being selected to maintain said displacement factor for said currents and voltages across said phase shifting interphase transformer.

6. The static inverter of claim 1, wherein said combining means comprises sets of phase shifting interphase transformers combining outputs of pairs of said multiple pulse three-phase static inverter stages and additional sets of phase shifting interphase transformers arranged in a hierarchy combining outputs of pairs of said sets of phase shifting interphase transformers to produce a single combined three-phase output.

7. The static inverter of claim 1, wherein said plurality of multipulse three-phase static inverter stages comprises three such stages and wherein said combining means comprises a phase shifting interphase transformer combining the outputs of a pair of said multiphase three-phase static inverter stages which are in phase with the output of the third multipulse three-phase static inverter stage, and a current splitting interphase transformer connected to said phase splitting interphase transformer and said third multipulse three-phase static inverter stage to produce a single three-phase output.

8. The static inverter of claim 1, wherein said plurality of multipulse three-phase static inverter stages comprises an odd number, and wherein said combining means comprises sets of phase shifting interphase transformers combining outputs of pairs of said multipulse three-phase static inverter stages to generate intermediate outputs, and additional phase shifting interphase transformers combining said intermediate outputs to produce a single pairs output for said pairs of multipulse three-phase static inverter stages which is in phase with a remaining multipulse three-phase static inverter stage, and a current splitting interphase transformer which combines said single pairs output and said output of said remaining multipulse three-phase static inverter stage to produce a single final output.

\* \* \* \* \*